No. 807,832. PATENTED DEC. 19, 1905.
T. J. LINDSAY.
STEERING AXLE FOR MOTOR VEHICLES.
APPLICATION FILED JULY 14, 1905.
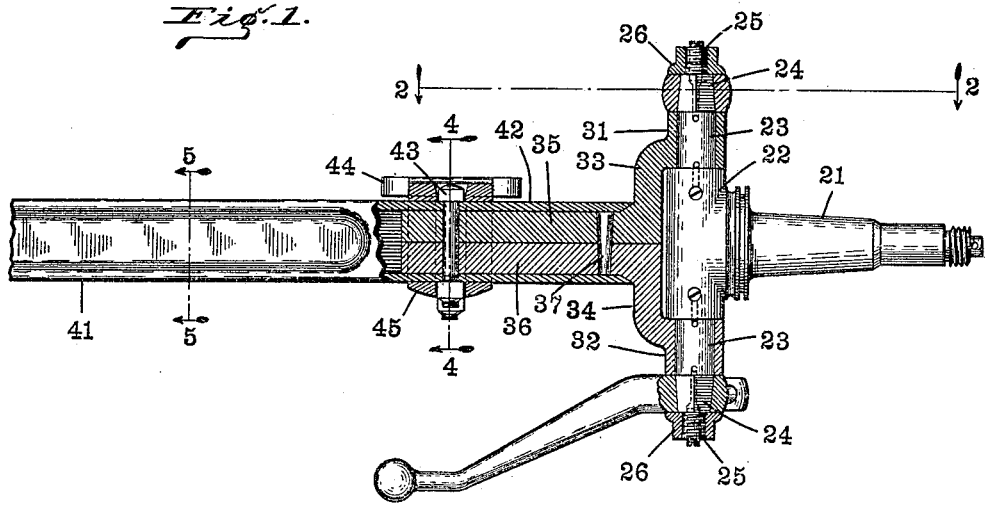
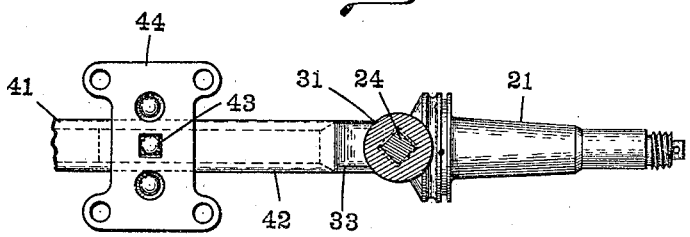
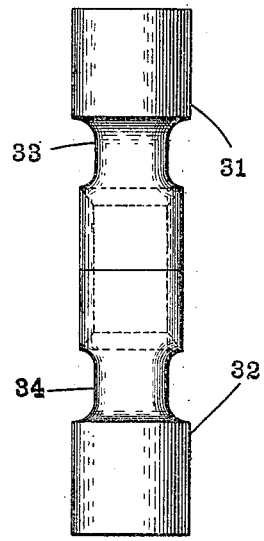
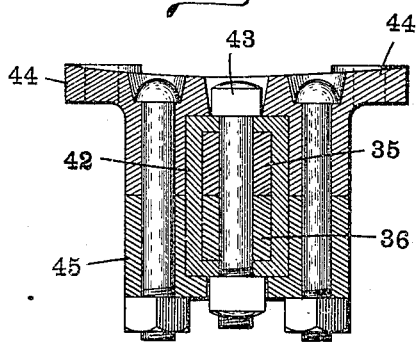
Witnesses
Frank A. Fahle
J. A. Walsh
Inventor
Thomas J. Lindsay
By Bradford & Hood,
Attorneys

UNITED STATES PATENT OFFICE.

THOMAS J. LINDSAY, OF INDIANAPOLIS, INDIANA.

STEERING-AXLE FOR MOTOR-VEHICLES.

No. 807,832. Specification of Letters Patent. Patented Dec. 19, 1905.

Application filed July 14, 1905. Serial No. 269,677.

*To all whom it may concern:*

Be it known that I, THOMAS J. LINDSAY, a citizen of the United States, residing at Indianapolis, in the county of Marion and State of Indiana, have invented certain new and useful Improvements in Steering-Axles for Motor-Vehicles, of which the following is a specification.

My present invention relates to that class of axles which are used as the front axles of motor-vehicles, wherein the wheel-spindle is embodied in a T-shaped structure pivotally mounted and adapted to be swung on such pivotal mounting in steering the vehicle. The most common way of making such axles heretofore has been to provide a longitudinal perforation through the T-shaped head of the spindle structure and pass a bolt through this perforation and the adjacent bearings. The bearing on such bolt has consequently been no longer than the length of the T-shaped head itself, and there has consequently been a marked tendency to wearing loose, so that the wheel-spindle would tip somewhat, throwing the wheels out of line.

A principal object of my invention is to make the T-shaped head and its bearings all in one piece, so as to enlarge the distance from the center of the axle to the end of the bearings, and thus decrease the leverage of the spindle on said bearings, so as to increase their effective life. In order to do this properly, the bearing structure must not only be made in two parts, but these parts must be very rigidly united and also securely and firmly fastened to the axle proper.

My said invention therefore consists in a construction whereby I am enabled to achieve these results, as will be hereinafter more particularly described and claimed.

The accompanying drawings illustrate an axle structure embodying my present invention.

Figure 1 is a view, partly in side elevation and partly in longitudinal vertical section, of such a structure; Fig. 2, a plan view as seen when looking downwardly from the dotted line 2 2 in Fig. 1; Fig. 3, an end elevation, on an enlarged scale, of the yoke containing the bearings for the T-head of the spindle separately; Fig. 4, a transverse sectional view as seen when looking in the direction indicated by the arrows from the dotted line 4 4 in Fig. 1, and Fig. 5 a detail sectional view of the axle as I prefer to construct it at the point indicated by the dotted line 5 5 in Fig. 1.

The spindle structure is, generally speaking, of the ordinary T-shaped form, the spindle 21 being disposed horizontally and the head 22 vertically. Prolongations 23 of this T-shaped head form the bearing portions thereof, and one or more further prolongations 24 constitute the members to which the appropriate arms of the steering-gear are connected. These parts 24 are preferably square and somewhat tapered, as shown. Still further prolongations 25 are screw-threaded and carry nuts 26. The effective bearing distance is therefore extended to the ends of the prolongations 23 instead of stopping at the ends of the center or main part 22 of the T-shaped head.

The two bearings 31 and 32, in which the T-shaped head is mounted, develop into the two arms 33 and 34. The prolongations 23 of said T-shaped head fit closely in said bearings, and the arm portions 33 and 34 carrying said bearings approach each other and come together in the middle of the structure and then extend out horizontally, the horizontal portions 35 and 36 extending out a sufficient distance so that they can be firmly united to the axle proper. Said axle proper, 41, is shown as terminating in sleeves 42, which extend over and closely embrace said horizontal portions 35 and 36. A taper pin 37 is driven through the portions 35 and 36. After said sleeve-like axle end is slipped thereover a bolt 43 is passed through both said sleeve-like axle end and said horizontal portions 35 and 36. A spring-seat composed of two parts 44 and 45 surrounds the structure at this point and not only forms a seat for the vehicle-spring, which rests upon the axle at this point, but embraces the head of the bolt 43 and also its nut, thus preventing them from turning, and so uniting all these parts very securely at this point.

Having thus fully described my said invention, what I claim as new, and desire to secure by Letters Patent, is—

1. The combination of a T-shaped spindle structure embodying bearing portions and ends beyond the bearings to receive a steering-arm, a steering-arm adapted to be removably secured to one of said ends, a two-part bearing structure in which said spindle structure is mounted, an axle, and means whereby said two-part bearing structure is securely united to said axle.

2. The combination of a T-shaped spindle structure, a two-part bearing structure therefor embodying horizontal portions, and an axle having a sleeve-like end adapted to slip over and surround said horizontal portions.

3. The combination of a T-shaped spindle structure having bearing portions formed rigidly therewith, a two-part bearing structure in which the bearing portions on the spindle are mounted having members extending horizontally in line with the axle proper, said axle, having its ends formed to embrace said horizontal members, and means for clamping said members and said axle ends firmly and rigidly together.

4. The combination of a T-shaped spindle structure, a two-part bearing structure in which it is mounted and having horizontal portions meeting centrally, a sleeve carried by the axle extending over said horizontal portions, a bolt passing through the sleeve and said horizontal portions, and a spring-seat embracing the bolt and preventing the same from turning.

5. The combination of a spindle structure, a two-part bearing structure in which the same is pivotally mounted and having horizontal portions which meet centrally, a pin passing through said horizontal portions and holding them from relative lateral displacement, a sleeve connected with the axle and extending over said horizontal portions and said pin, and means whereby said sleeve is firmly secured thereon.

In witness whereof I have hereunto set my hand and seal, at Indianapolis, Indiana, this 11th day of July, A. D. 1905.

THOMAS J. LINDSAY. [L. S.]

Witnesses:
 CHESTER BRADFORD,
 JAMES A. WALSH.